(12) United States Patent
Lee (10) Patent No.: US 12,405,748 B2
(45) Date of Patent: Sep. 2, 2025

(54) BUFFER CHIP, AND SEMICONDUCTOR PACKAGE INCLUDING BUFFER CHIP AND MEMORY CHIPS

(71) Applicant: SK hynix Inc., Icheon-si (KR)

(72) Inventor: Seong Ju Lee, San Jose, CA (US)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/520,228

(22) Filed: Nov. 27, 2023

(65) Prior Publication Data

US 2024/0361954 A1    Oct. 31, 2024

Related U.S. Application Data

(60) Provisional application No. 63/530,853, filed on Aug. 4, 2023, provisional application No. 63/462,854, filed on Apr. 28, 2023.

(51) Int. Cl.
    *G06F 3/06*    (2006.01)
(52) U.S. Cl.
    CPC .......... *G06F 3/0656* (2013.01); *G06F 3/0604* (2013.01); *G06F 3/0673* (2013.01)

(58) Field of Classification Search
    CPC ..... G06F 3/0656; G06F 3/0673; G06F 3/0604
    See application file for complete search history.

(56) References Cited

U.S. PATENT DOCUMENTS

| | | | |
|---|---|---|---|
| 10,713,137 B2 * | 7/2020 | Kim | G11C 29/4401 |
| 2017/0277463 A1 * | 9/2017 | Yoon | G06F 11/1441 |
| 2021/0407567 A1 * | 12/2021 | Kim | G11C 7/1063 |
| 2022/0238146 A1 * | 7/2022 | Woo | G11C 7/1006 |
| 2023/0072674 A1 | 3/2023 | Vogelsang et al. | |
| 2024/0194227 A1 * | 6/2024 | Wu | H01L 25/0657 |
| 2024/0264947 A1 * | 8/2024 | Kim | G06F 12/0246 |
| 2024/0321831 A1 * | 9/2024 | Shin | H01L 24/06 |

* cited by examiner

*Primary Examiner* — Mark A Giardino, Jr.
(74) *Attorney, Agent, or Firm* — WILLIAM PARK & ASSOCIATES LTD.

(57) ABSTRACT

A buffer chip includes a chip select signal reception circuit for receiving one or more system chip select signals transmitted from a memory controller and a chip ID reception circuit for receiving chip ID information transmitted from the memory controller. The buffer chip also includes a chip select signal generation circuit that generates memory chip select signals by using the one or more system chip select signals and the chip ID information and a chip select signal transmission circuit that transmits the memory chip select signals to a plurality of memory chips.

10 Claims, 11 Drawing Sheets

BUFFER CHIP, AND SEMICONDUCTOR PACKAGE INCLUDING BUFFER CHIP AND MEMORY CHIPS

CROSS-REFERENCE TO RELATED APPLICATIONS

This application claims priority under 35 U.S.C. § 119 (a) to U.S. Provisional Application No. 63/462,854 filed on Apr. 28, 2023 and U.S. Provisional Application No. 63/530,853 filed on Aug. 4, 2023, which are incorporated herein by reference in their entirety.

BACKGROUND

1. Technical Field

Various embodiments of the present disclosure relate to a semiconductor package including a buffer chip and a memory chip, and a memory module including the same.

2. Related Art

Recently, as application fields utilizing artificial intelligence and big data increase, the amount of data to be processed is explosively increasing. Many computer systems (for example, data centers, servers, and the like) require large amounts of memory, and applications using the computer systems require larger amounts of memory than system capabilities. However, it is becoming increasingly difficult to add memory to computer systems due to issues such as latency and bandwidth. Various methods for increasing the amount of memory in a system while maintaining low latency and high bandwidth are being studied.

SUMMARY

In an embodiment, a buffer chip may include: a chip select signal reception circuit for receiving one or more system chip select signals transmitted from a memory controller; a chip ID reception circuit for receiving chip ID information transmitted from the memory controller; a chip select signal generation circuit that generates memory chip select signals by using the one or more system chip select signals and the chip ID information; and a chip select signal transmission circuit that transmits the memory chip select signals to a plurality of memory chips.

In an embodiment, a semiconductor package may include: a package substrate including a plurality of terminals for communication with a memory controller and a plurality of bonding pads for communication inside a package; a buffer chip disposed on the package substrate; a plurality of memory chips stacked on the buffer chip; and a plurality of wires connecting the plurality of bonding pads and the plurality of memory chips. The buffer chip may communicate with the memory controller through the plurality of terminals of the package substrate and the plurality of memory chips may communicate with the buffer chip through the plurality of wires and the plurality of bonding pads of the package substrate. The buffer chip may include: a chip select signal reception circuit for receiving one or more system chip select signals transmitted from the memory controller; a chip ID reception circuit for receiving chip ID information transmitted from the memory controller; a chip select signal generation circuit that generates memory chip select signals by using the one or more system chip select signals and the chip ID information; and a chip select signal transmission circuit that transmits the memory chip select signals to a plurality of memory chips.

In an embodiment, a buffer chip may include: a chip select signal reception circuit for receiving chip select signals transmitted from a memory controller; a command address reception circuit for receiving command address signals transmitted from the memory controller; a command address delay circuit that delays, by a set latency, the command address signals received by the command address reception circuit; a chip select signal transmission circuit that transmits the chip select signals to a plurality of memory chips; and a command address transmission circuit for transmitting the command address signals delayed by the command address delay circuit to the plurality of memory chips.

DETAILED DESCRIPTION

Various embodiments are directed to reduce loading due to an increase in memory while increasing the capacity of the memory. Furthermore, various embodiments are directed to providing a technique for efficiently selecting memory chips included in one semiconductor package.

Embodiments of the present disclosure can reduce loading due to an increase in memory while increasing the capacity of the memory. Furthermore, Embodiments of the present disclosure can efficiently select memory chips included in one semiconductor package.

Hereafter, embodiments in accordance with the technical spirit of the present disclosure are described with reference to the accompanying drawings.

Figure 1:
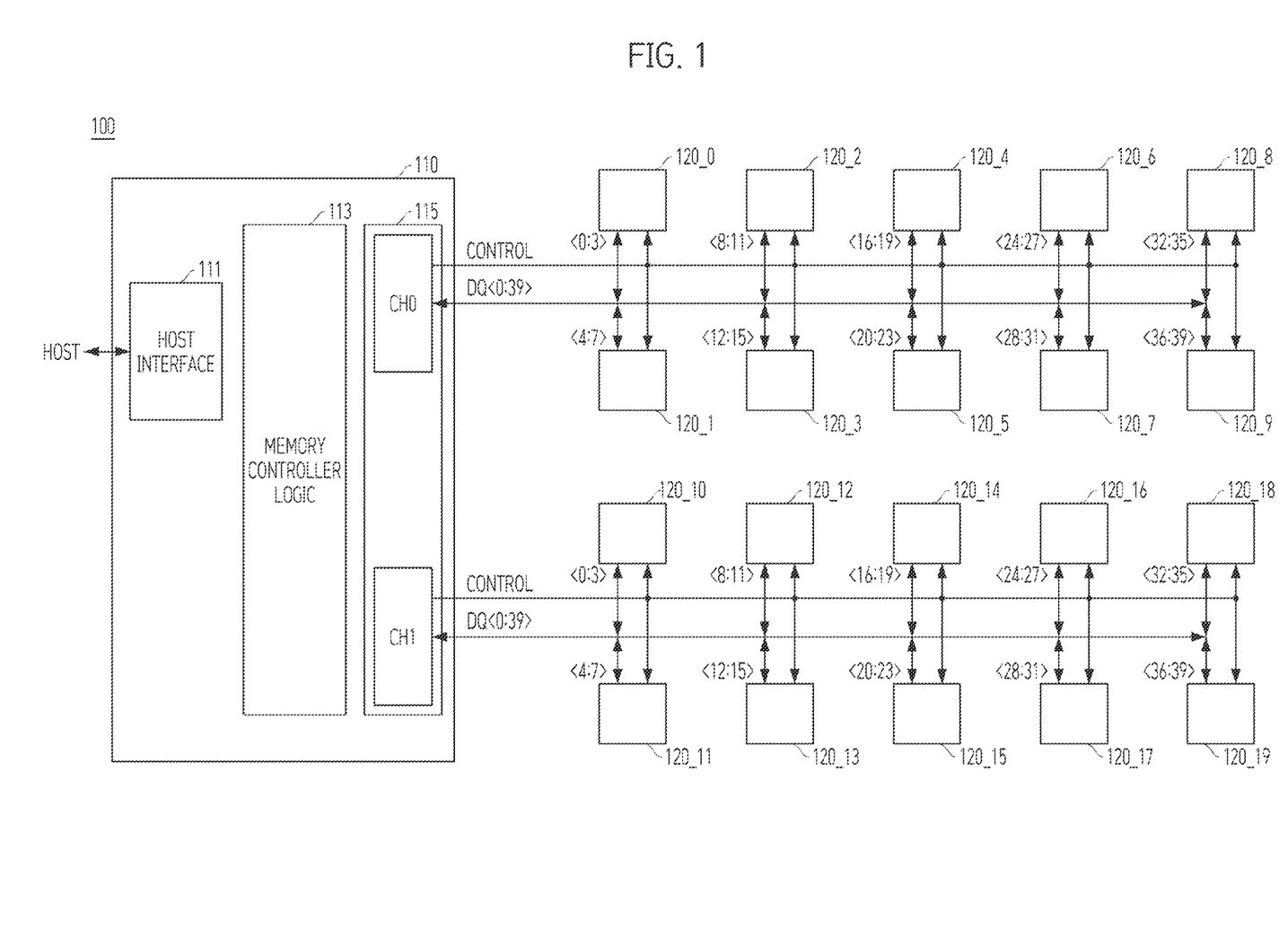
FIG. 1 is a configuration diagram of a memory module 100 in accordance with an embodiment.

FIG. 1 is a configuration diagram of a memory module 100 in accordance with an embodiment.

Referring to FIG. 1, the memory module 100 may include a module controller 110 and memory packages 120_0 to 120_19.

The module controller 110 may include a host interface 111, a memory controller logic 113, and a memory interface 115. The memory controller logic 113 and the memory interface 115 are also referred to as a memory controller.

The host interface 111 may be used for communication between the module controller 110 and a host HOST (computer system). The host interface 111 may be a compute express link (CXL) interface. The CXL interface is an interface based on peripheral component interconnect express (PCIe), and may be an interface made so that a central processing unit (CPU), a graphic processing unit (GPU), and various types of accelerators more efficiently use memory and the like. By connecting the memory module 100 to the host HOST through the CXL interface, the memory capacity of a computer system such as a data center and a server can be increased, and various processors in the computer system can share the memory.

The memory controller logic 113 may be a logic for controlling the memory packages 120_0 to 120_19, and the memory interface 115 may be an interface for communication with the memory packages 120_0 to 120_19. The memory interface 115 may include two channels CH0 and CH1. Ten memory packages 120_0 to 120_9 may be connected to the channel CH0 of the memory interface 115, and ten memory packages 120_10 to 120_19 may be connected to the channel CH1.

The channel CH0 of the memory interface 115 may be connected to the memory packages 120_0 to 120_9 through 40 data lines DQ<0:39>. Four different data lines may be connected to the memory packages 120_0 to 120_9. For example, four data lines DQ<0:3> may be connected to the memory package 120_0, and four data lines DQ<4:7> may be connected to the memory package 120_1.

The channel CH0 of the memory interface 115 may be connected to the memory packages 120_0 to 120_9 through control signal transmission lines CONTROL. The control signal transmission lines CONTROL may include a plurality of lines, and may be common to the memory packages 120_0 to 120_9. For example, all of the control signal transmission lines CONTROL may be connected to the memory package 120_0 and may also be connected to the memory package 120_1. Although not illustrated in FIG. 1, lines for transmitting clocks and data strobe signals may be further connected between the channel CH0 of the memory interface 115 and the memory packages 120_0 to 120_9.

The channel CH1 of the memory interface 115 and the memory packages 120_10 to 120_19 may be connected in the same way as the channel CH0 and the memory packages 120_0 to 120_9.

Each of the memory packages 120_0 to 120_19 may include one or more memory chips (for example, DRAM chips). Because one of the important reasons for using the memory module 100 is to greatly increase the capacity of a memory, it is general that each of the memory packages 120_0 to 120_19 includes a plurality of memory chips. As one of the methods of putting a plurality of memory chips into a memory package, a method such as 3 dimensional stacking (3DS) has been used. The 3DS method uses a through-silicon via (TSV) for communication between memory chips in a memory package. However, when a memory package is manufactured in this way, the price of the memory package may increase because a lot of time and cost are required in packaging.

In the memory module 100 in accordance with an embodiment of the present disclosure, each of the memory packages 120_0 to 120_19 may include a buffer chip and a plurality of memory chips. The buffer chip may perform a buffer operation between the module controller 110 and the plurality of memory chips. The plurality of memory chips included in each of the memory packages 120_0 to 120_19 may be connected to the buffer chip through wire bonding. The memory module 100 may increase a memory capacity by using the plurality of memory chips and reduce loading due to an increase in memory by using a buffer chip.

However, the configuration of the memory packages 120_0 to 120_19 disclosed in the present specification is merely an example and the present teachings are not limited thereto. For example, each of the memory packages 120_0 to 120_19 may include different types of memory chips. For example, at least one of the memory packages 120_0 to 120_19 may have a different configuration from other memory packages and/or may be connected to the module controller 110 in a different way. For example, memory chips included in at least one of the memory packages 120_0 to 120_19 may be integrated using a 3 dimensional stacking (3DS) method, a monolithic 3D (M3D) method, or the like. For example, memory chips included in at least one of the memory packages 120_0 to 120_19 may communicate with each other by using through-silicon vias (TSVs) or vias with a smaller size and higher density than the TSVs.

The form factor of the memory module 100 may have various forms such as an add-in-card (AIC) and an enterprise and data center SSD form factor (EDSFF).

Figure 2:
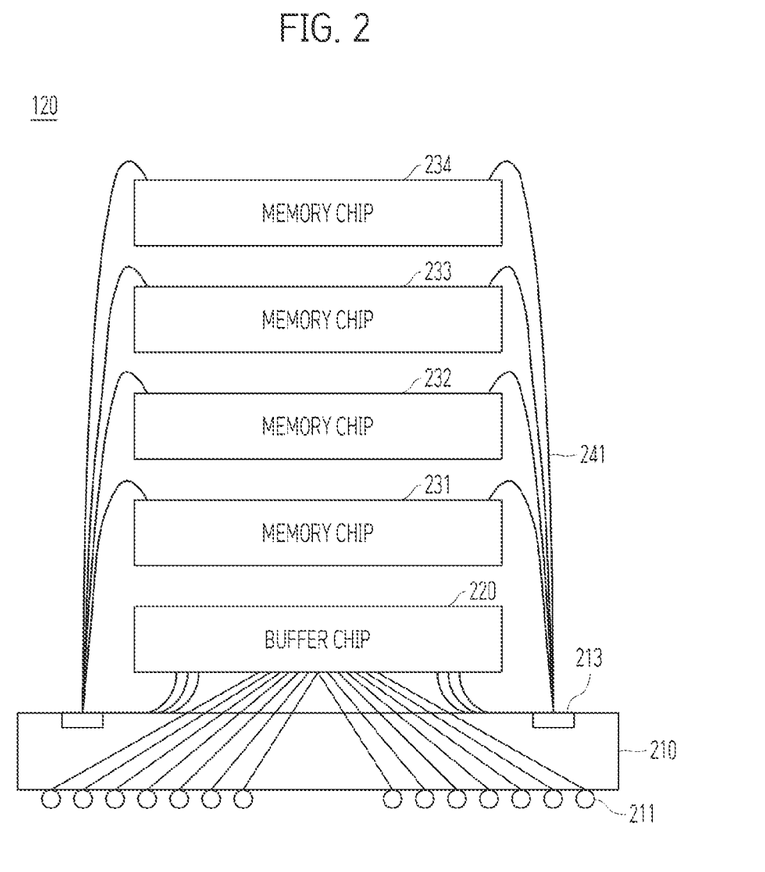
FIG. 2 is a configuration diagram of an embodiment of a memory package 120 in FIG. 1.

FIG. 2 is a configuration diagram of an embodiment of the memory package 120 in FIG. 1.

Referring to FIG. 2, the memory package 120 may include a package substrate 210, a buffer chip 220, and a plurality of memory chips 231 to 234.

The package substrate 210 may include a plurality of package balls 211 that are terminals for communication with the memory interface 115 (FIG. 1) and a plurality of bonding pads 213 for communication inside the memory package 120.

The buffer chip 220 may be disposed on the package substrate 210. The buffer chip 220 may communicate with the memory interface 115 (FIG. 1) through the package balls 211 of the package substrate 210. The buffer chip 220 may further communicate with the memory chips 231 to 234 through the bonding pads 213 of the package substrate 210.

The memory chips 231 to 234 may be stacked on the buffer chip 220, and may communicate with the buffer chip 220 through wires 241 connecting the bonding pads 213 and the memory chips 231 to 234. The memory chips 231 to 234 may communicate with the memory interface 115 (FIG. 1) through the buffer chip 220. The control signals and the data transmitted from the memory interface 115 (FIG. 1) may be transmitted to the buffer chip 220 through the package balls 211, buffered, and then transmitted from the buffer chip 220 to the memory chips 231 to 234 through the bonding pads 213. Data transmitted from the memory chips 231 to 234 may be transmitted to the buffer chip 220 through the bonding pads 213, buffered, and then transmitted to the memory interface 115 (FIG. 1) through the package balls 211.

Because only the buffer chip 220 among the chips of the memory package 120 may be connected to the memory interface 115 (FIG. 1), loading between the memory package 120 and the memory interface 115 (FIG. 1) may be reduced to enable high-speed operation. Because the buffer chip 220 and the memory chips 231 to 234 are connected through wiring instead of a TSV that consumes a lot of cost in a manufacturing process, the manufacturing cost of the memory package 120 may be reduced.

Figure 3:
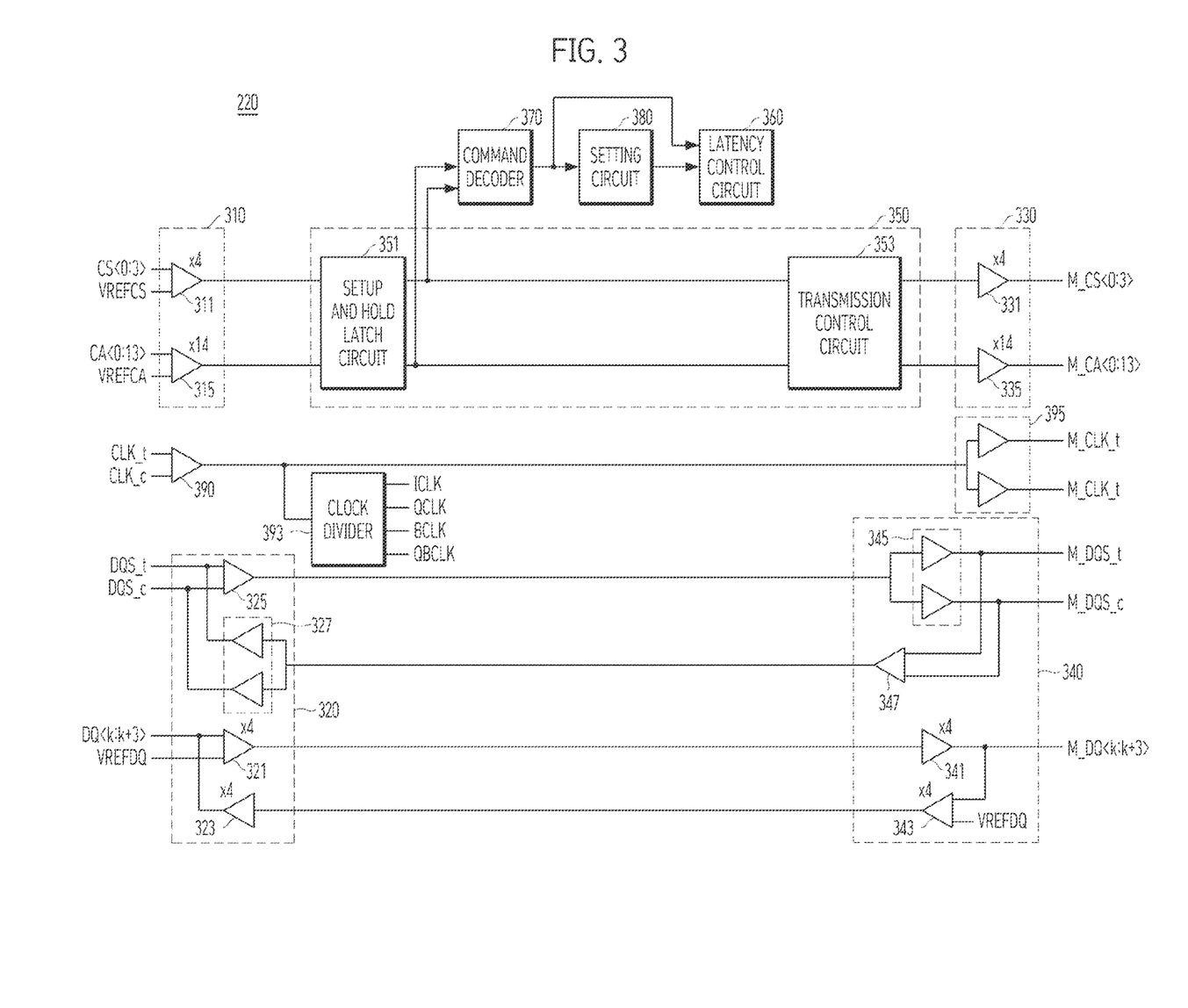
FIG. 3 is a configuration diagram of an embodiment of a buffer chip 220 in FIG. 2.

FIG. 3 is a configuration diagram of an embodiment of the buffer chip 220 in FIG. 2.

Referring to FIG. 3, the buffer chip 220 may include an external control signal interface 310, an external data interface 320, an internal control signal interface 330, an internal data interface 340, a control signal transmission circuit 350, a latency control circuit 360, a command decoder 370, a setting circuit 380, a clock reception circuit 390, a clock divider 393, and a clock transmission circuit 395.

The external control signal interface 310 may receive the control signals transmitted from the memory interface 115 (FIG. 1). The control signals may include chip select signals CS<0:3> and command address signals CA<0:13>. The external control signal interface 310 may include a chip select signal reception circuit 311 and a command address reception circuit 315.

The chip select signals CS<0:3> are used for distinguishing the memory chips 231 to 234 (FIG. 2) in the memory package 120 (FIG. 2), that is, for distinguishing ranks, and the number of chip select signals CS<0:3> may be the same as the number of the memory chips 231 to 234 (FIG. 2) in the memory package 120. In FIG. 3, because the number of chip select signals CS<0:3> is illustrated as 4, the chip select signal reception circuit 311 may include four reception buffers. The buffers of the chip select signal reception circuit 311 may receive the chip select signals CS<0:3> by comparing voltage levels of the chip select reference voltage VREFCS and the chip select signals CS<0:3> with each other.

The command address reception circuit 315 may include the same number of reception buffers as the number of command address signals CA<0:13>. In FIG. 3, because the number of command address signals CA<0:13> is illustrated as 14, the command address reception circuit 315 may include 14 reception buffers. The buffers of the command address reception circuit 315 may receive the command address signals CA<0:13> by comparing voltage levels of a command address reference voltage VREFCA and the command address signals CA<0:13> with each other.

The external data interface 320 may transmit/receive data DQ<k:k+3> (k is an integer equal to or greater than 0) to/from the memory interface 115 (FIG. 1). The external data interface 320 may transmit/receive not only the data DQ<k:k+3> but also data strobe signals DQS_t and DQS_c for strobing the data DQ<k:k+3>. The external data interface 320 may include an external data reception circuit 321, an external data transmission circuit 323, an external data strobe reception circuit 325, and an external data strobe transmission circuit 327.

The external data reception circuit 321 may include the same number of reception buffers as the number of terminals to which the data DQ<k:k+3> are input. In FIG. 3, because four data terminals are provided for each memory package 120 (FIG. 2), the external data reception circuit 321 may include four reception buffers. Buffers of the external data reception circuit 321 may receive the data DQ<k:k+3> by comparing voltage levels of the data reference voltage VREFDQ and the data DQ<k:k+3> with each other.

The external data strobe reception circuit 325 may receive the data strobe signals DQS_t and DQS_c transmitted from the memory interface 115 (FIG. 1), together with the data DQ<k:k+3>. Because the data strobe signals DQS_t and DQS_c are differential-type signals, the external data strobe reception circuit 325 may include a reception buffer that compares voltage levels of a data strobe signal DQS_t and a data strobe bar signal DQS_c with each other and receives them.

The external data transmission circuit 323 may transmit the data DQ<k:k+3>. The external data transmission circuit 323 may include four transmission drivers.

The external data strobe transmission circuit 327 may transmit the data strobe signals DQS_t and DQS_c for strobing the data DQ<k:k+3> transmitted by the external data transmission circuit 323. The external data strobe transmission circuit 327 may include two transmission drivers.

The clock reception circuit 390 may receive clocks CLK_t and CLK_c transmitted from the memory interface 115 (FIG. 1). Because the clocks CLK_t and CLK_c are differential-type signals, the clock reception circuit 390 may include a reception buffer that compares voltage levels of the clock CLK_t and the clock bar CLK_c and receives them.

The clock divider 393 may divide the clocks CLK_t and CLK_c received by the clock reception circuit 390. First to fourth clocks ICLK, QCLK, BCLK, and QBCLK generated by the clock divider 393 may each have a frequency of half the frequency of each of the clocks CLK_t and CLK_c, and may have different phases. The clocks CLK_t and CLK_c received by the clock reception circuit 390 and the first to fourth clocks ICLK, QCLK, BCLK, and QBCLK generated by the clock divider 393 may be used by various components inside the buffer chip 220.

The control signal transmission circuit 350 may buffer the control signals received through the external control signal interface 310, and transmit the buffered control signals to the internal control signal interface 330. The control signal transmission circuit 350 may include a setup and hold latch circuit 351 for securing a setup hold margin and a transmission control circuit 353 performing a buffering operation.

The internal control signal interface 330 may transmit control signals M_CS<0:3> and M_CA<0:13> transmitted through the control signal transmission circuit 350 to the memory chips 231 to 234 (FIG. 2). The command address signals M_CA<0:13> may be transmitted in common to the memory chips 231 to 234 (FIG. 2), and the chip select signals M_CS<0:3> may be transmitted to the memory chips 231 to 234 (FIG. 2) in a one-to-one manner. That is, the chip select signal M_CS<0> may be transmitted to the memory chip 231 (FIG. 2), the chip select signal M_CS<1> may be transmitted to the memory chip 232 (FIG. 2), the chip select signal M_CS<2> may be transmitted to the memory chip 233 (FIG. 2), and the chip select signal M_CS<3> may be transmitted to the memory chip 234 (FIG. 2).

The internal control signal interface 330 may include a chip select signal transmission circuit 331 and a command address transmission circuit 335. Because the number of chip select signals M_CS<0:3> is 4, the chip select signal transmission circuit 331 may include four transmission drivers. Also, because the number of command address signals M_CA<0:13> is 14, the command address transmission circuit 335 may include 14 transmission drivers.

The internal data interface 340 may transmit/receive data M_DQ<k:k+3> to/from the memory chips 231 to 234 (FIG. 2). The data M_DQ<k:k+3> may be connected in common to the memory chips 231 to 234 (FIG. 2). When the data M_DQ<k:k+3> are transmitted in common to the memory chips 231 to 234 during a write operation, a memory chip selected to perform a write operation among the memory chips 231 to 234 (FIG. 2) may receive the data M_DQ<k:k+3> transmitted by the internal data interface 340. During a read operation, a memory chip selected to perform a read operation among the memory chips 231 to 234 (FIG. 2) may transmit the data M_DQ<k:k+3> to the internal data interface 340. The internal data interface 340 may transmit/receive not only the data M_DQ<k:k+3> but also the data strobe signals M_DQS_t and M_DQS_c for strobing the data M_DQ<k:k+3> to/from the memory chips 231 to 234 (FIG. 2).

The internal data interface 340 may include an internal data transmission circuit 341, an internal data reception circuit 343, an internal data strobe transmission circuit 345, and an internal data strobe reception circuit 347. The internal data transmission circuit 341 may include four transmission drivers, and the internal data reception circuit 343 may include four reception buffers. The internal data strobe transmission circuit 345 may include two transmission drivers, and the internal data strobe receive circuit 347 may include one reception buffer.

The clock transmission circuit 395 may transmit the clocks M_CLK_t and M_CLK_c to the memory chips 231 to 234 (FIG. 2). The clocks M_CLK_t and M_CLK_c may be transmitted in common to the memory chips 231 to 234 (FIG. 2). The clock transmission circuit 395 may include two transmission drivers.

The command decoder 370 may decode the chip select signals CS<0:3> and the command address signals CA<0:13> received through the external control signal interface 310. The command decoder 370 may receive and decode control signals latched by the setup and hold latch circuit 351 after being received by the external control signal interface 310. The chip select signals CS<0:3> indicate the validity of the command address signals CA<0:13>, and when even one of the four chip select signals CS<0:3> is activated to a low level, the command decoder 370 of the buffer chip 220 may determine that the command address signals CA<0:13> are valid and decode the command address signals CA<0:13>.

The setting circuit 380 may perform a setting operation according to the decoding result of the command decoder 370. Setting items of the setting circuit 380 may include a read latency of the buffer chip 220, a write latency of the buffer chip 220, levels of reference voltages used by the buffer chip 220, a termination resistance value (also referred to as Rtt) of the buffers of the buffer chip 220, a termination resistance value (also referred to as Ron) of the drivers of the buffer chip 220, an equalizing coefficient (for example, a coefficient of decision feedback equalization) of the buffer chip 220, and the like.

The latency control circuit 360 may control the activation or deactivation of the external data interface 320 and the internal data interface 340. The latency control circuit 360 may activate the external data reception circuit 321 and the internal data transmission circuit 341 so that the data DQ<k:k+3> transmitted from the memory interface 115 to the buffer chip 220 may be received after a write latency set by the setting circuit 380 from the time point when a write command is applied to the buffer chip 220 and transmitted to the memory chips 231 to 234 (FIG. 2). The latency control circuit 360 may further activate the internal data reception circuit 343 and the external data transmission circuit 323 so that data DQ<k:k+3> buffered after being received from the memory chips 231 to 234 (FIG. 2) may be transmitted from the buffer chip 220 to the memory interface 115 (FIG. 1) after a read latency set by the setting circuit 380 from the time point when a read command is applied to the buffer chip 220. The latency control circuit 360 may activate the external data strobe reception circuit 325 and the internal data strobe transmission circuit 345 during the write operation and activate the internal data strobe reception circuit 347 and the external data strobe transmission circuit 327 during the read operation so that the data strobe signals DQS_t and DQS_c may also be transmitted and received together with the data DQ<k:k+3>. The latency control circuit 360 may receive information indicating that the read command and the write command have been applied to the buffer chip 220 from the command decoder 370, and receive information related to the read latency and the write latency from the setting circuit 380.

Figure 4:
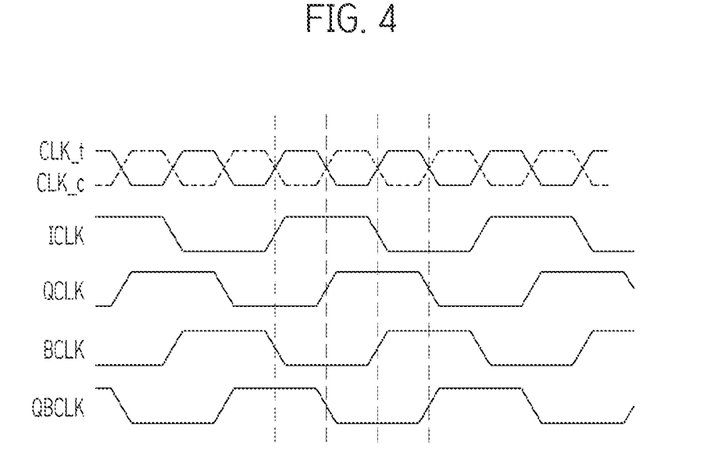
FIG. 4 is a diagram illustrating first to fourth clocks ICLK, QCLK, BCLK, and QBCLK generated by a clock divider 390 in FIG. 3.

FIG. 4 is a diagram illustrating the first to fourth clocks ICLK, QCLK, BCLK, and QBCLK generated by the clock divider 393 in FIG. 3.

Referring to FIG. 4, the first to fourth clocks ICLK, QCLK, BCLK, and QBCLK generated by the clock divider 393 may each have a frequency of half the frequency of each of the clocks CLK_t and CLK_c, and may have a phase difference of 90° among the first to fourth clocks ICLK, QCLK, BCLK, and QBCLK.

Figure 5:
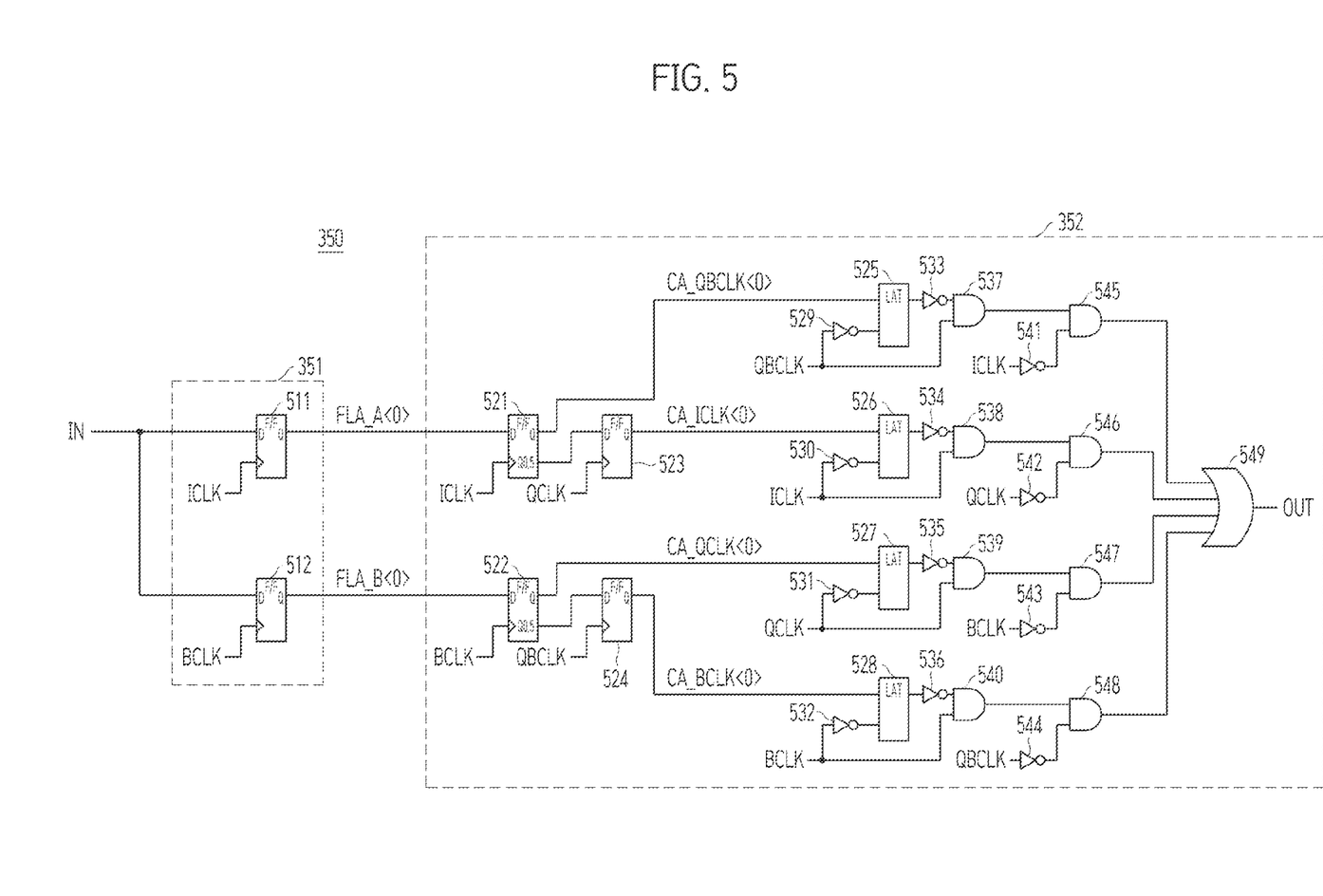
FIG. 5 is a configuration diagram of an embodiment of a control signal transmission circuit 350 in FIG. 3.
Figure 6:
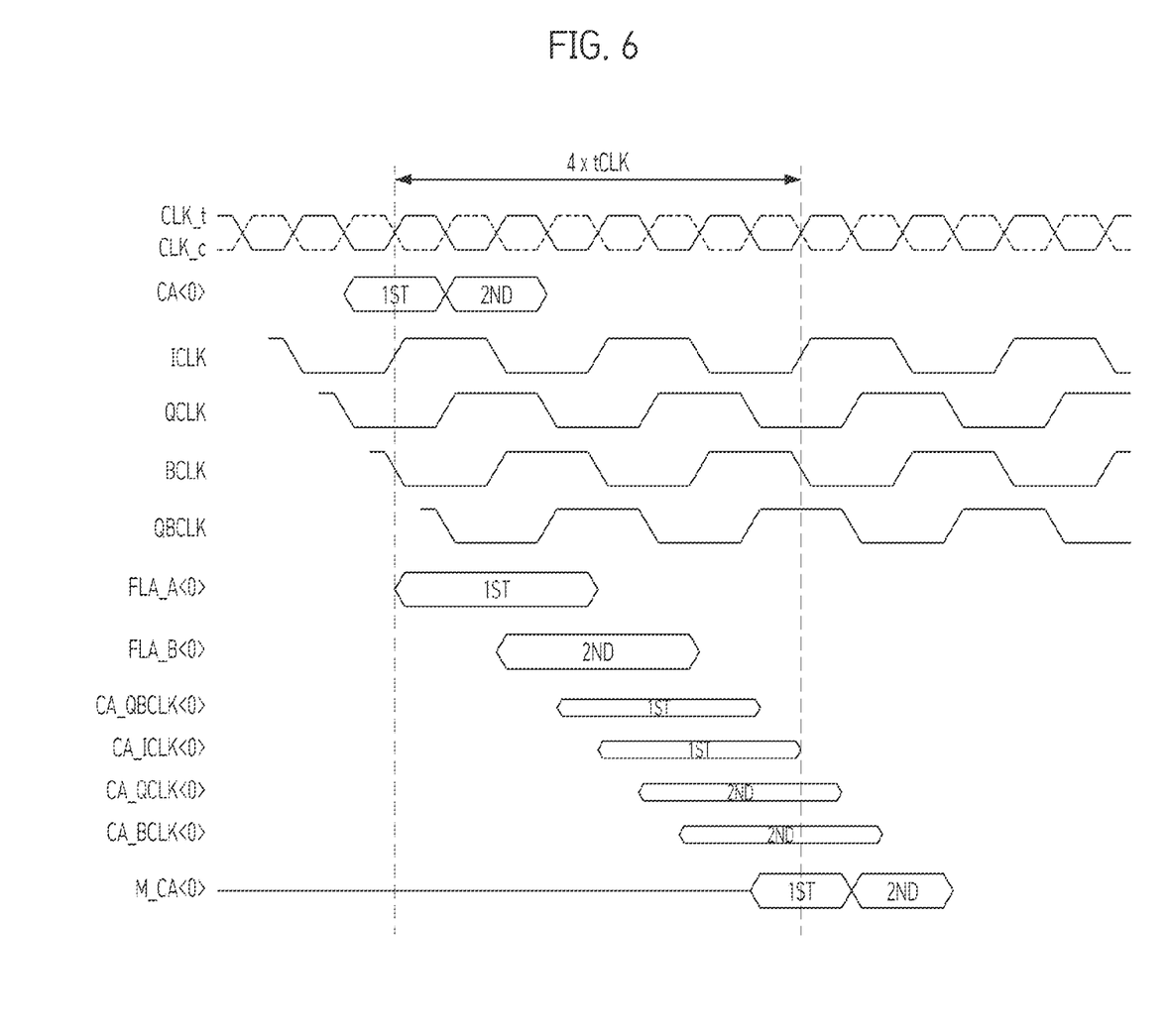
FIG. 6 is an operation timing diagram of FIG. 5.

FIG. 5 is a configuration diagram of an embodiment of the control signal transmission circuit 350 in FIG. 3, and FIG. 6 is an operation timing diagram of the control signal transmission circuit 350. FIG. 5 illustrates components for transmitting the command address signal CA<0> in the control signal transmission circuit 350. The remaining control signals CA<1:13> and CS<0:3> may also be transmitted in the same way as the command address signal CA<0>.

Referring to FIG. 5, the setup and hold latch circuit 351 of the control signal transmission circuit 350 may include D flip-flops 511 and 512. An input IN of the D flip-flops 511 and 512 may be an output of a buffer of the command address reception circuit 315 in FIG. 3, which receives the command address signal CA<0>. The D flip-flop 511 may receive an input at a rising edge of a first clock ICLK, latch the received input, and output a signal FLA_A<0>, and the D flip-flop 512 may receive an input at a rising edge of a third clock BCLK, latch the received input, and output a signal FLA_B<0>. Referring to FIG. 6 together, a signal 1ST of a first cycle of the command address signal CA<0> may be latched by the D flip-flop 511 and output as the signal FLA_A<0>, and a signal 2ND of a second cycle of the command address signal CA<0> may be latched by the D flip-flop 512 and output as the signal FLA_B<0>.

The transmission control circuit 352 of the control signal transmission circuit 350 may include D flip-flops 521 to 524, D latches 525 to 528, inverters 529 to 536 and 541 to 544, AND gates 537 to 540 and 545 to 548, and an OR gate 549.

Figure 7:
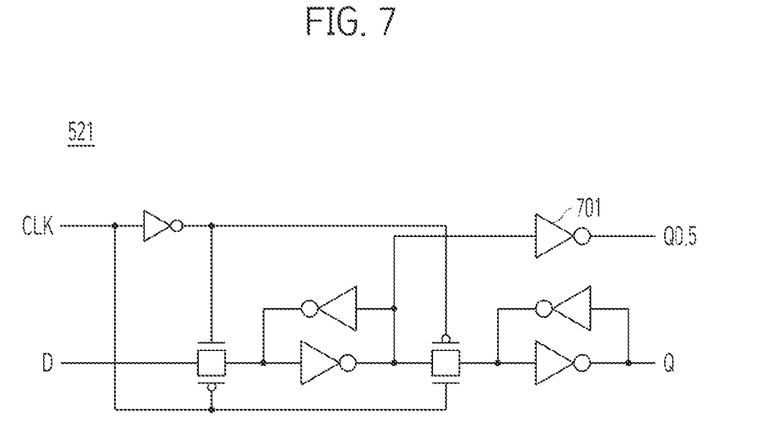
FIG. 7 is a diagram illustrating an internal configuration of a D flip-flop 521.

The D flip-flop 521 may receive and latch the signal FLA_A<0> at the rising edge of the first clock ICLK. A signal output as an output Q of the D flip-flop 521 is indicated by CA_QBCLK<0>. An output Q0.5 of the D flip-flop 521 may be an output of a first stage of the D flip-flop 521 including two stages. FIG. 7 illustrates the internal configuration of the D flip-flop 521, and the D flip-flop 521 may further include an inverter 701 for outputting the output Q0.5 from a latch of the first stage in addition to the configuration of a general D flip-flop. The D flip-flop 523 may receive and latch the output Q0.5 of the D flip-flop 521 at a rising edge of the second clock QCLK, and output the latched output as a signal CA_ICLK<0>. Referring to FIG. 6, the signals CA_QBCLK<0> and CA_ICLK<0> may have a phase difference equal to a phase difference between the first clock ICLK and the second clock QCLK.

The D flip-flop 522 may receive and latch the signal FLA_B<0> at the rising edge of the third clock BCLK. A signal output as an output Q of the D flip-flop 522 is indicated by CA_QCLK<0>. The D flip-flop 524 may receive and latch an output Q0.5 of the D flip-flop 522 at a rising edge of the fourth clock QBCLK, and output the latched output as a signal CA_BCLK<0>. Referring to FIG. 6, the signals CA_QCLK<0> and CA_BCLK<0> may have a phase difference equal to a phase difference between the third clock BCLK and the fourth clock QBCLK.

The D latch 525 may latch and output the signal CA_QBCLK<0> while the fourth clock QBCLK is at a low level, an output of the D latch 525 may be inverted by the inverter 533, and an output of the inverter 533 and the fourth clock QBCLK may be input to the AND gate 537. An output of the AND gate 537 may be input to the AND gate 545 together with the first clock ICLK inverted by the inverter 541.

The D latch 526 may latch and output the signal CA_ICLK<0> while the first clock ICLK is at a low level, an output of the D latch 526 may be inverted by the inverter 534, and an output of the inverter 534 and the first clock ICLK may be input to the AND gate 538. An output of the AND gate 538 may be input to the AND gate 546 together with the second clock QCLK inverted by the inverter 542.

The D latch 527 may latch and output the signal CA_QCLK<0> while the second clock QCLK is at a low level, an output of the D latch 527 may be inverted by the inverter 535, and an output of the inverter 535 and the second clock QCLK may be input to the AND gate 539. An output of the AND gate 539 may be input to the AND gate 547 together with the third clock BCLK inverted by the inverter 543.

The D latch 528 may latch and output the signal CA_BCLK<0> while the third clock BCLK is at a low level, an output of the D latch 528 may be inverted by the inverter 536, and an output of the inverter 536 and the third clock BCLK may be input to the AND gate 540. An output of the AND gate 540 may be input to the AND gate 548 together with the fourth clock QBCLK inverted by the inverter 544.

Outputs of the AND gates 545 to 548 may be input to the OR gate 549, and an output OUT of the OR gate 549 may be an input of a driver of the command address transmission circuit 335 in FIG. 3, which transmits the command address signal M_CA<0>.

Referring to FIG. 6, it can be seen that the command address signal CA<0> received from the memory interface 115 (FIG. 1) by the command address reception circuit 315 of the buffer chip 220 may be buffered by the control signal transmission circuit 350, delayed by 4 clock cycles based on the clocks CLK_t and CLK_c, and transmitted to the memory chips 231 to 234 (FIG. 2) by the command address transmission circuit 335.

To use the memory package 120 (FIG. 2) including the memory chips 231 to 234 (FIG. 2) and the buffer chip 220 of FIG. 3, the memory controller needs to generate four chip select signals CS<0:3> and transmit the generated chip select signals CS<0:3> to the memory package 120 (FIG. 2). There are various types and manufacturers of memory controllers. Some memory controllers might not generate the chip select signals CS<0:3> as many as the number of memory chips (for example, 4) inside the memory package 120, and a chip ID used in a memory package such as 3DS may be used. The memory package 120 including the buffer chip 220 as illustrated in FIG. 3 might not operate properly with such a memory controller.

Figure 8:
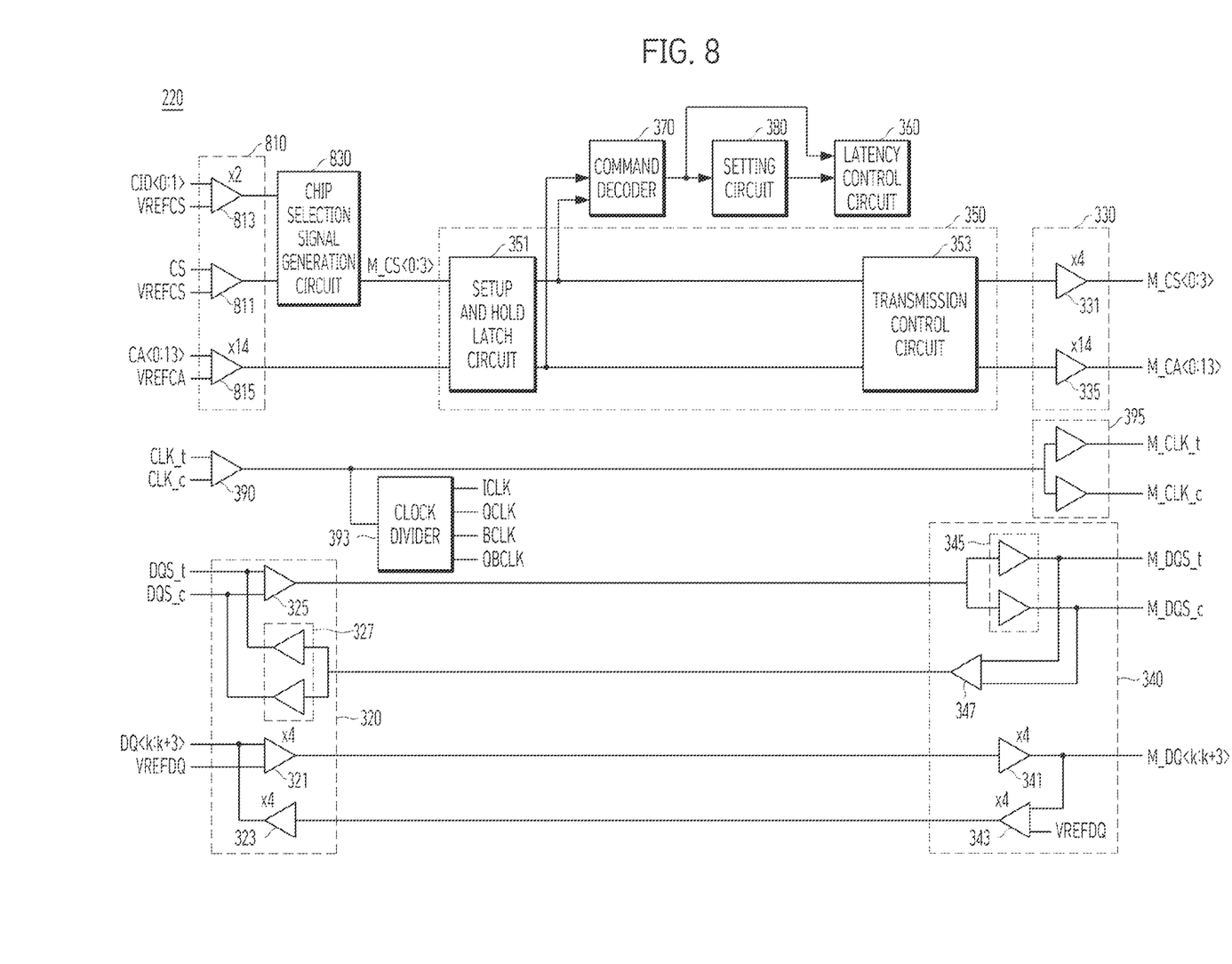
FIG. 8 is a configuration diagram of another embodiment of the buffer chip 220 in FIG. 2.

FIG. 8 is a configuration diagram of another embodiment of the buffer chip 220 in FIG. 2. With reference to FIG. 8, an embodiment in which the buffer chip 220 generates a larger number of chip select signals than the number of chip select signals received by the buffer chip 220 will be described.

Referring to FIG. 8, the buffer chip 220 may include an external control signal interface 810, the external data interface 320, the internal control signal interface 330, the internal data interface 340, the control signal transmission circuit 350, the latency control circuit 360, the command decoder 370, the setting circuit 380, the clock reception circuit 390, the clock divider 393, the clock transmission circuit 395, and a chip select signal generation circuit 830.

The external control signal interface 810 may include a chip select signal reception circuit 811, a chip ID reception circuit 813, and a command address reception circuit 815.

The chip select signal reception circuit 811 may receive a system chip select signal CS. In the present embodiment, the memory controller uses a smaller number of system chip select signals CS than the number of memory chips 231 to 234 (FIG. 2) inside the memory package 120 (FIG. 2). In the present embodiment, because the chip select signal CS received by the buffer chip 220 from the memory controller is different the chip select signals M_CS<0:3> transmitted by the buffer chip 220 to memory chips 231 to 234 (FIG. 2), the chip select signal CS received by the buffer chip 220 is referred to as a system chip select signal and the chip select signals M_CS<0:3> transmitted by the buffer chip 220 are referred to as memory chip select signals.

The chip ID reception circuit 813 may receive a chip ID CID<0:1>. The chip ID CID<0:1> is an ID for selecting memory chips in a memory package including a plurality of memory chips such as 3DS, and may be understood as an address for selecting a chip. The chip ID reception circuit 813 may include two reception buffers. The buffers of the chip ID reception circuit 813 may receive the chip ID CID<0:1> by comparing voltage levels of the chip select reference voltage VREFCS and the chip ID CID<0:1>. In the present embodiment, the chip ID CID<0:1> is 2 bits, but the number of bits of the chip ID may vary according to the number of memory chips included in the memory package 120 (FIG. 2).

The command address reception circuit 815 may include the same number of reception buffers as the number of command address signals CA<0:13>. Because the number of command address signals CA<0:13> is 14, the command address reception circuit 815 may include 14 reception buffers. The buffers of the command address reception circuit 815 may receive the command address signals CA<0:13> by comparing voltage levels of the command address reference voltage VREFCA and the command address signals CA<0:13>.

The chip select signal generation circuit 830 may generate the memory chip select signals M_CS<0:3> by using the system chip select signal CS received by the chip select reception circuit 811 and the chip ID CID<0:1> received by the chip ID reception circuit 813. The chip select signal generation circuit 830 may generate a larger number of memory chip select signals M_CS<0:3> than the number of system chip select signals CS. The configuration and operation of the chip select signal generation circuit 830 will be described in detail together with FIG. 9. The memory chip select signals M_CS<0:3> generated by the chip select signal generation circuit 830 may be transmitted to the memory chips 231 to 234 (FIG. 2) through the control signal transmission circuit 350 and the chip select signal transmission circuit 331.

The memory package 120 (FIG. 2) including the buffer chip 220 may operate together with the memory controller, which does not generate system chip select signals CS as many as the number of memories 231 to 234 (FIG. 2), by the chip select signal generation circuit 830.

Figure 9:
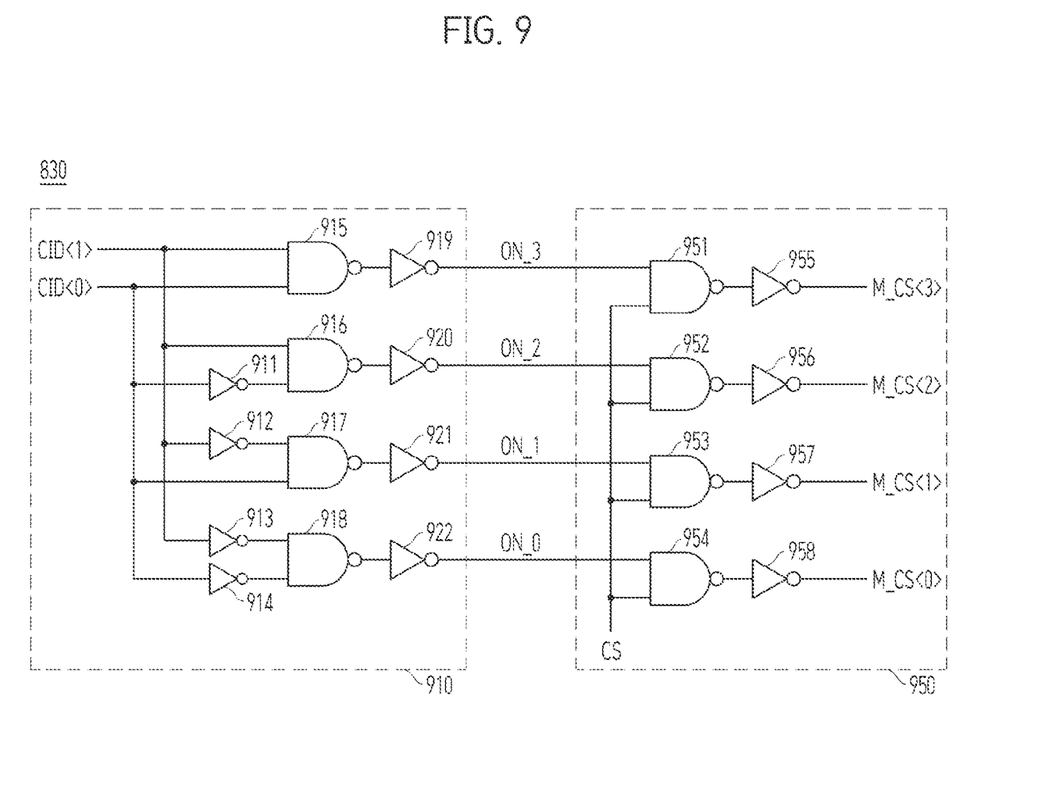
FIG. 9 is a configuration diagram of an embodiment of a chip select signal generation circuit 830 in FIG. 8.

FIG. 9 is a configuration diagram of an embodiment of the chip select signal generation circuit 830 in FIG. 8.

Referring to FIG. 9, the chip select signal generation circuit 830 may include a decoding unit 910 and a signal generation unit 950.

The decoding unit 910 may decode the chip ID CID<0:1> to activate one of four ON signals ON_0 to ON_3. When the chip ID CID<0:1> has a value of '00', the on signal ON_0 may be activated, and when the chip ID CID<0:1> has a value of '01', the on signal ON_1 may be activated. When the chip ID CID<0:1> has a value of '10', the on signal ON_2 may be activated, and when the chip ID CID<0:1> has a value of '11', the on signal ON_3 may be activated. The decoding unit 910 may include inverters 911 to 914 and 919 to 922 and NAND gates 915 to 918 for decoding.

When the system step chip select signal CS is activated, the signal generation unit 950 may activate a memory chip select signal corresponding to an activated ON signal among the ON signals ON_0 to ON_3. For example, the signal generation unit 950 may activate the memory chip select signal M_CS<0> when the ON signal ON_0 and the system chip select signal CS are activated, and activate the memory chip select signal M_CS<2> when the ON signal ON_2 and the system chip select signal CS are activated. The signal generation unit 950 may include NAND gates 951 to 954 and inverters 955 to 958.

In FIG. 8, the chip select signal generation circuit 830 generates the four memory chip select signals M_CS<0:3> by using the 2-bit chip ID CID<0:1> and the system chip select signal CS, but this configuration may be changed when the number of memory chips included in the memory package 120 (FIG. 2) is different from the number of the memory chip select signals M_CS<0:3>. For example, when 8 memory chips are included in the memory package 120 (FIG. 2), the chip select signal generation circuit 830 may also generate 8 memory chip select signals M_CS<0:7> by using a 3-bit chip ID CID<0:2> and the system chip select signal CS.

Figure 10:
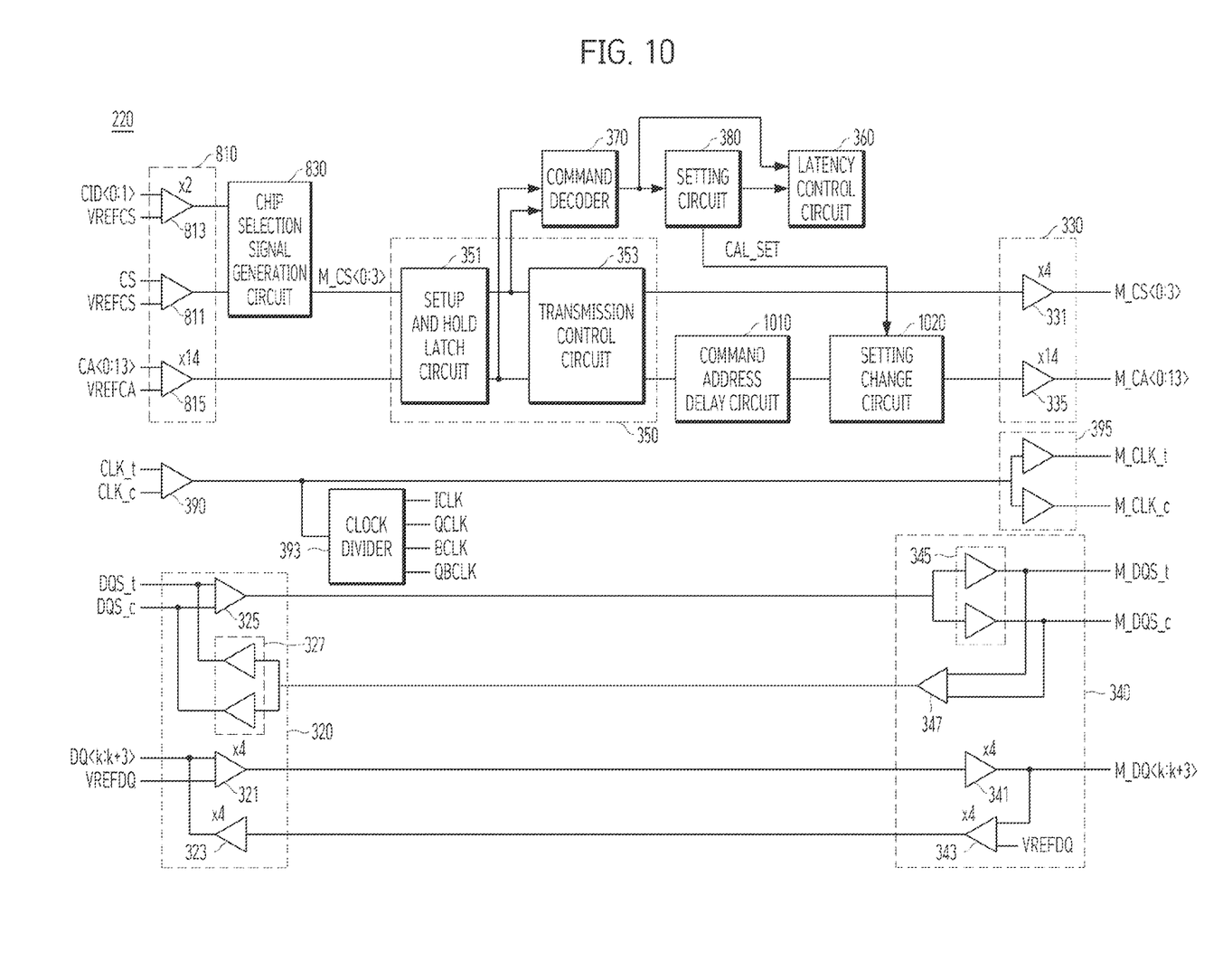
FIG. 10 is a configuration diagram of further another embodiment of the buffer chip 220 in FIG. 2.

FIG. 10 is a configuration diagram of further another embodiment of the buffer chip 220 in FIG. 2. With reference to FIG. 10, an embodiment in which the buffer chip 220 itself sets a command address latency CAL of the memory chips 231 to 234 (FIG. 2) to reduce the current consumption of the memory chips 231 to 234 (FIG. 2) will be described.

Referring to FIG. 10, the buffer chip 220 may include the external control signal interface 810, the external data interface 320, the internal control signal interface 330, the internal data interface 340, the control signal transmission circuit 350, the latency control circuit 360, the command decoder 370, the setting circuit 380, the clock reception circuit 390, the clock divider 393, the clock transmission circuit 395, the chip select signal generation circuit 830, a command address delay circuit 1010, and a setting change circuit 1020.

The setting change circuit 1020 may change a setting value related to the command address latency CAL of the memory chips 231 to 234 (FIG. 2). When a latency setting signal CAL_SET activated when setting the command address latency is activated, the setting change circuit 1020 may allow the memory chips 231 to 234 to be set to a specific command address latency value by changing a value (that is, a value for setting the command address latency) of some of the command address signals M_CA<0:13> transmitted to the memory chips 231 to 234. For example, even though the memory controller sets the value of the command address latency CAL of the memory chips 231 to 234 to '0', the setting change circuit 1020 may change a value of some of the command address signals M_CA<0:13> so that the value of the command address latency CAL of the memory chips 231 to 234 may be changed to a specific value of '3'. The latency setting signal CAL_SET may be activated by the setting circuit 380 at the time point at which the memory controller sets the command address latency CAL. The command address latency CAL may refer to a latency from the time point at which the memory chips 231 to 234 receive the memory chip select signals M_CS<0:3> to the time point at which the memory chips 231 to 234 receive the command address signals M_CA<0:13>.

Even though the memory controller sets the command address latency CAL of the memory chips 231 to 234 (FIG. 2) to '0' by the operation of the setting change circuit 1020, the command address latency CAL of the memory chips 231 to 234 may be changed by the buffer chip 220 and set to a specific value of '3'.

The command address delay circuit 1010 may delay the command address signals M_CA<0:13>, which is to be transmitted by the buffer chip 220 to the memory chips 231 to 234 (FIG. 2), by the command address latency CAL set by the setting change circuit 1020. Because the command address latency CAL of the memory chips 231 to 234 (FIG. 2) is set by the buffer chip 220 other than the memory controller by the setting change circuit 1020, the buffer chip 220 needs to delay the command address signals M_CA<0:13> by the command address latency CAL, and the command address delay circuit 1010 may perform this delay operation. Before the setting change circuit 1020 sets the command address latency CAL of the memory chips 231 to 234, the delay operation of the command address delay circuit 1010 may be deactivated and the command address delay circuit 1010 may allow the command address signals M_CA<0:13> to be bypassed.

FIG. 10 illustrates that the setting change circuit 1020 and the command address delay circuit 1010 are located at the rear end of the control signal transmission circuit 350; however, the setting change circuit 1020 and the command address delay circuit 1010 may be located at different points on a path through which the command address signals M_CA<0:13> are transmitted in the buffer chip 220.

Figure 11:
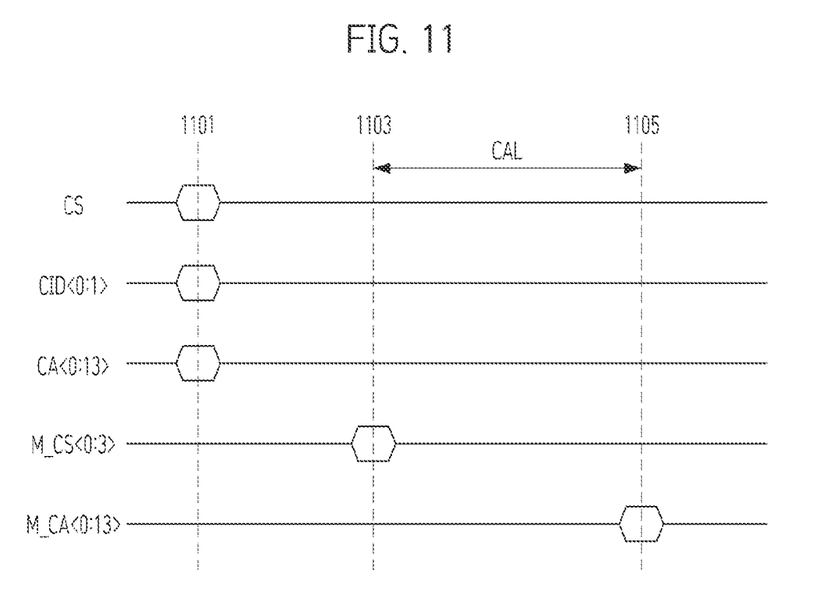
FIG. 11 is a timing diagram illustrating an operation of the buffer chip 220 in FIG. 10.

FIG. 11 is a timing diagram illustrating the operation of the buffer chip 220 in FIG. 10.

Referring to FIG. 11, at a time point 1101, a system chip select signal CS, chip ID information CID<0:1>, and command address signals CA<0:13> may be transmitted from the memory controller to the buffer chip 220.

At a time point 1103, memory chip select signals M_CS<0:3> may be transmitted from the buffer chip 220 to the memory chips 231 to 234 (FIG. 2). A time difference between the time point 1101 and the time point 1103 may be due to buffering of the control signal transmission circuit 350.

At a time point 1105 when a time corresponding to the command address latency CAL has elapsed from time point 1103, command address signals M_CA<0:13> may be transmitted from the buffer chip 220 to the memory chips 231 to 234 (FIG. 2). A time difference between the time point 1103 at which the memory chip select signals M_CS<0:3> are transmitted to the memory chips 231 to 234 (FIG. 2) and the time point 1105 at which the command address signals M_CA<0:13> are transmitted to the memory chips 231 to 234 (FIG. 2) may be due to a delay operation of the command address delay circuit 1010.

By setting the command address latency CAL, the memory chips 231 to 234 (FIG. 2) may maintain buffers for receiving the command address signals M_CA<0:13> in an deactivated state, and activate the buffers for receiving the command address signals M_CA<0:13> only when chip select signals corresponding to the memory chips 231 to 234 are activated, thereby reducing current consumption of the memory chips 231 to 234. For example, the memory chip 232 may activate the buffers for receiving the command address signals M_CA<0:13> only for a predetermined time after the memory chip select signal M_CS<1> is activated, and the memory chip 234 activate the buffers for receiving the command address signals M_CA<0:13> only for a predetermined time after the memory chip select signal M_CS<3> is activated, thereby reducing current consumption.

When the buffer chip 220 itself sets the command address latency CAL, the time for which the command address signal M_CA<0:13> are transmitted to the memory chips 231 to 234 (FIG. 2) may be changed, so that the time for which data DQ<k:k+3> are transmitted from the memory chips 231 to 234 (FIG. 2) to the memory controller through the buffer chip 220 may be changed differently from the expectation of the memory controller. However, because the memory controller finds out the actual timing at which the data DQ<k:k+3> are transmitted from the memory chips 231 to 234 (FIG. 2) by performing a training operation during an initial operation and performs an operation accordingly, such a time difference might not be problematic for a stable operation of a memory system.

Although some embodiments according to the technical idea of the present disclosure have been described above with reference to the accompanying drawings, this is only for explaining the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure.

What is claimed is:

1. A buffer chip comprising:
a chip select signal reception circuit for receiving one or more system chip select signals transmitted from a memory controller;
a chip ID reception circuit for receiving chip ID information transmitted from the memory controller;
a chip select signal generation circuit that generates memory chip select signals by using the one or more system chip select signals and the chip ID information; and
a chip select signal transmission circuit that transmits the memory chip select signals to a plurality of memory chips;
a command address reception circuit for receiving command address signals transmitted from the memory controller;
a command address delay circuit that delays, by a set latency, the command address signals received by the command address reception circuit;
a command address transmission circuit for transmitting the command address signals delayed by the command address delay circuit to the plurality of memory chips; and
a setting change circuit for changing a command address latency of the plurality of memory chips to be different from a setting value of the memory controller.

2. The buffer chip of claim 1, wherein the number of the memory chip select signals is larger than the number of the system chip select signals.

3. The buffer chip of claim 2, wherein the number of the memory chip select signals is equal to the number of memory chips in the plurality of memory chips.

4. The buffer chip of claim 1, wherein a transmission timing of the memory chip select signals to the plurality of memory chips is different from a transmission timing of the delayed command address signals to the plurality of memory chips.

5. A semiconductor package comprising:
a package substrate including a plurality of terminals for communication with a memory controller and a plurality of bonding pads for communication within the package;
a buffer chip disposed on the package substrate and directly connected to the plurality of terminals of the package substrate for communication with the memory controller;
a plurality of memory chips stacked on the buffer chip; and
a plurality of wires for wire bonding, connecting the plurality of bonding pads and the plurality of memory chips,
wherein the buffer chip communicates with the memory controller through the plurality of terminals of the package substrate,
wherein the plurality of memory chips communicate with the buffer chip via wire bonding through the plurality of wires and the plurality of bonding pads of the package substrate, and
wherein the buffer chip comprises:
a chip select signal reception circuit for receiving one or more system chip select signals transmitted from the memory controller;
a chip ID reception circuit for receiving chip ID information transmitted from the memory controller;
a chip select signal generation circuit that generates memory chip select signals by using the one or more system chip select signals and the chip ID information;
a chip select signal transmission circuit that transmits the memory chip select signals to a plurality of memory chips;
a command address reception circuit for receiving command address signals transmitted from the memory controller;
a command address delay circuit that delays the command address signals, which are received by the command address reception circuit, by a set latency:
a command address transmission circuit for transmitting the command address signals delayed by the command address delay circuit to the plurality of memory chips; and
a setting change circuit for changing a command address latency of the plurality of memory chips to be different from a setting value of the memory controller.

6. The semiconductor package of claim 5, wherein the number of the memory chip select signals is larger than the number of the system chip select signals.

7. The semiconductor package of claim 6, wherein the number of the memory chip select signals is equal to the number of memory chips in the plurality of memory chips.

8. The semiconductor package of claim 5, wherein a transmission timing of the memory chip select signals from the buffer chip to the plurality of memory chips is different from a transmission timing of the delayed command address signals from the buffer chip to the plurality of memory chips.

9. A buffer chip comprising:
a chip select signal reception circuit for receiving chip select signals transmitted from a memory controller;
a command address reception circuit for receiving command address signals transmitted from the memory controller;
a command address delay circuit that delays, by a set latency, the command address signals received by the command address reception circuit;
a chip select signal transmission circuit that transmits the chip select signals to a plurality of memory chips;
a command address transmission circuit for transmitting the command address signals delayed by the command address delay circuit to the plurality of memory chips; and
a setting change circuit for changing a command address latency of the plurality of memory chips to be different from a setting value of the memory controller.

10. The buffer chip of claim 9, wherein a transmission timing of the memory chip select signals to the plurality of memory chips is different from a transmission timing of the delayed command address signals to the plurality of memory chips.

* * * * *